United States Patent [19]

Dunham

[11] Patent Number: 4,980,190

[45] Date of Patent: Dec. 25, 1990

[54] TOMATO PUREE SUBSTITUTE AND PROCESS FOR MAKING THE SAME

[76] Inventor: Diana Dunham, P.O. Box 341, Norma, N.J. 08347

[21] Appl. No.: 296,138

[22] Filed: Jan. 12, 1989

[51] Int. Cl.⁵ ............................................. A23L 1/212
[52] U.S. Cl. .................................. 426/589; 426/615; 426/638
[58] Field of Search ............... 426/615, 650, 589, 270, 426/638, 639, 250

[56] References Cited

U.S. PATENT DOCUMENTS

| | | | |
|---|---|---|---|
| 2,145,108 | 1/1939 | Cooper | 426/589 |
| 2,331,308 | 10/1943 | Cooper | 426/589 |
| 2,731,352 | 1/1956 | Scharf | 426/589 |
| 3,630,757 | 12/1971 | Meed | 426/615 |
| 3,709,700 | 1/1973 | Ross | 426/650 |
| 4,087,560 | 5/1978 | Gao | 426/638 |

FOREIGN PATENT DOCUMENTS 2943779  5/1981  Fed. Rep. of Germany ...... 426/638

163462  10/1982  Japan ................................. 426/638

OTHER PUBLICATIONS

Rombauer, 1985, Joy of Cooking, Bobbs–Merril Co., Inc., pp. 328–330, 847–848.
Ziemann, 1929, The White House Cookbook, Saalfield Publishing Co., Akron, Ohio, pp. 197–201.
Francatelli, 1846, French Cookery, Lea and Blanchard, pp. 36–42.
Woman's Day, Encyclopedia of Cooking, vol. II, 1966, Fawcett Publications Inc., New York, pp. 1758–1763.

*Primary Examiner*—Carolyn Paden
*Attorney, Agent, or Firm*—Charles F. Duffield

[57] ABSTRACT

A substitute for tomato puree prepared from the pureed pulp of squash chosen from the group of summer squash and the pureed pulp of peppers chosen from the group consisting of sweet peppers which have ripened to a red color mixed in the ratio of approximately two parts of squash pulp to one part pepper pulp by raw vegetable weight.

8 Claims, No Drawings

TOMATO PUREE SUBSTITUTE AND PROCESS FOR MAKING THE SAME

BACKGROUND OF INVENTION

The present invention relates to the field of edible food products and, more specifically, to a food base used as a substitute for tomato puree useful in making condiments such as sauces, ketchups and the like.

A large portion of the population is unable to utilize food products in which there is included tomato pulp as a base for the product. This inability is based upon many factors including the acidity of the tomato base and the individual's particular allergy to the same. Accordingly, there exists a great need for a simulated tomato puree product which will have the characteristics of tomato puree, i.e. flowability, eye appeal and mouth feel, while not having any of the negative effects upon taste.

Tomato puree is a well known and widely used food base comprised of a basic tomato paste of a thick yet flowable consistency and is the basic ingredient in many food condiments such as spaghetti sauce, ketchup and the like. While tomato puree comprises a major portion of such products, both by weight and volume, its contribution to the taste thereof is limited and the spice and seasonings which are added to the tomato puree in preparing the condiment are the primary contributors to the distinctive flavor associated with the condiment and provide it with its unique identity.

The most significant function of tomato puree in condiments such as sauces and ketchup is to provide the basic consistency and degree of flowability which is generally associated with the condiment. The degree of flow associated with tomato puree is considered to be very important to the user of the ultimate condiment associated therewith for eye appeal, body and mouth feel and accordingly, any tomato puree substitute must have the body and flow consistency of tomato puree to be acceptable while, at the same time, not creating a bad taste associated particularly with the substitute product.

Various attempts have been made in the prior art to provide a substitute for tomato puree in various products wherein the tomato puree is substituted either in portion or in toto. U.S. Pat. No. 2,331,308 (Cooper) substitutes a ketchup base in part by the utilization of a beet pulp. In U.S. Pat. No. 3,630,757 (Meid) a simulated tomato product is provided containing substantially no tomato solids but having substituted therefor a bodying agent, preferably mustard seed hulls, together with a gum or starch material. In U.S. Pat. No. 3,788,862 (Hoover) a partially simulated tomato product is disclosed comprising tomato solids and an admixture of starch, de-oiled soy meal and animal protein together with sweetening agents and edible organic acid crystals. Further in U.S. Pat. No. 4,087,560 (Yao) tomato paste has added thereto carrot pulp.

None of the tomato base or tomato puree substitutes set forth above or known in the prior art provide a complete and adequate solution to the problem in that, in many cases, the substitution is only partial and in others there remain various problems such as eye appeal, mouth feel, taste and the like not being adequate. None of the products known in the prior art provide the novel and unique advantages of the tomato puree substitute of the present invention.

SUMMARY OF THE INVENTION

In accordance with the present invention, a tomato puree substitute is created by the blending of pureed squash pulp and pepper pulp. The squash pulp is chosen from the group consisting of summer squash. The pepper pulp is chosen from the group consisting of sweet peppers that have ripened to a red color. The pureed pulps are mixed together in an approximate ratio of two parts squash pulp to one part pepper pulp measured by raw vegetable weight prior to being pureed. The substitute tomato puree may then be used in various condiments such as spaghetti sauces, ketchups, barbecue sauces and the like.

Accordingly, it is the primary object of the present invention to provide an edible food product which may be used as a tomato puree substitute and which, both in taste and appearance, is nearly identical to tomato puree but which contains a substitute for the tomato puree.

It is a further object of the present invention to provide a tomato puree like product for use as a base for condiments which is virtually indistinguishable both in appearance and taste from pure tomato puree.

DETAILED DESCRIPTION OF THE INVENTION

In accordance with a preferred embodiment of the present invention, an edible food product is provided which is virtually indistinguishable from tomato puree when in use in prepared condiments, not only in taste, but also in other physical attributes commonly associated therewith, including but not limited to body, consistency, color and most significantly, the degree of flow. Accordingly, a process for preparation of the same is also set forth in detail.

In accordance with the present invention, the substitute tomato puree basically consists of a mixture of squash pulp and pepper pulp. Squash is of the family cucurbitaceae. In accordance with the present invention, the most acceptable variety of squashes are the summer squashes (*cucurbita pepo*) which squashes demonstrate the best pulp for consistency, taste and other characteristics to provide the base for the substitute tomato puree. However, winter squashes (*cucurbita maxima*) in some instances may also be acceptable. Those specific varieties of summer squash which have been found to be the most desirable as the squash base are zucchini and crookneck squash. These squash, when pureed and reduced to a thick consistency, have substantially the same flowability as tomato puree or tomato paste and likewise demonstrate the basic eye appeal and mouth effect as tomato puree and do not have a negative taste effect. The zucchini puree becomes the base for the substitute tomato puree.

The pepper pulp utilized in the tomato puree substitute of the present invention is the pulp from the family of sweet peppers (capsicum annum) that have ripened to a red color. Particularly in the family or group of sweet peppers those found most desirable are the sweet bell, yolo wonder, California wonder and Italian long sweet peppers. As hereinafter described, the pepper pulp, when pureed with the squash pulp, adds the red color to the squash pulp to provide the eye appeal necessary for the tomato puree substitute of the present invention.

The zucchini used in the tomato puree substitute of the present invention is first prepared by peeling the zucchini. The zucchini is then sliced into appropriate slices and placed into an appropriate cooking utensil. A low heat is used permitting the zucchini to just simmer. No water generally should be used, or only a slight amount to prevent burning of the zucchini. The zucchini is heated for approximately one hour until the zucchini has reached a pulp consistency similar to that of tomato paste. After cooling, the zucchini is forced through an appropriate size sieve or screen to complete the pureeing of the zucchini.

In a like manner, the peppers are cut open and the seeds removed. They are likewise placed in an appropriate cooking utensil and maintained at a low heat for approximately one hour until they have reached an appropriate consistency. After cooling, they are passed through an appropriate sieve. Little or no water is likewise used with the peppers. If desired, the zucchini and peppers can be cooked in the same cooking utensil and intermixed during the cooking process to bring the mixture to an appropriate consistency. Thereafter, the combination is appropriately passed through a sieve.

The ratio of squash to peppers may vary according to an individual's particular preference. However, it has been found that an acceptable ratio is approximately a ratio of two parts of squash per one part of peppers based upon the fresh weight of the vegetables. By way of example, 2¼ pounds of squash and 1¼ pounds of peppers after pureeing will result in 2 pounds of pureed base material.

The resultant pureed squash and pepper base will have the appearance, consistency and mouth feel of tomato puree and may be used as a substitute for tomato puree in any recipe which calls for a tomato paste or tomato puree. As respects the taste of the substitute tomato puree, the resultant combination of the pureed squash and peppers is rather bland and does not contribute significantly to the taste of the resultant food product in which the puree is used. Instead, the other ingredients within the resultant food product within which the substitute tomato puree is used will be the dominant factor in the taste of the resultant product whereas the substitute tomato puree of the present invention will provide the color, flowability, appearance and mouth effect of tomato paste or tomato puree.

One use of the substitute tomato puree of the present invention is as a substitute for tomato puree in a spaghetti sauce. By way of example and not limitation, a spaghetti sauce recipe which has been found to be indistinguishable from spaghetti sauce utilizing pure tomato paste but prepared with the tomato puree substitute of the present invention is as follows:

one pound of ground beef appropriately browned;
two cloves of garlic heated until golden;
one cup of the substitute puree of the present invention simmered within the garlic and browned meat to form a paste;
one quart of substitute puree of the present invention cooked for one hour;
parsley flakes;
pinch of dry basil;
salt to taste.

The foregoing example of one recipe within which the tomato puree substitute of the present invention may be used is by way of illustration and example only. The substitute tomato puree or paste may be used in any recipe which calls for tomato paste.

From the foregoing description of the substitute tomato puree of the present invention, it will be appreciated that the puree of the present invention will have the color, consistency, flowability, eye appeal and other characteristics of tomato paste without the negative effects of the acidity or other problems of pure tomato puree and will be generally indistinguishable in that use.

The tomato puree substitute of the present invention has been described in respect to a particular embodiment thereof set forth in the specification. However, no limitation as to the scope of the invention is intended thereby but is to be interpreted in view of the appended claims.

What is claimed is:

1. The process of preparing an edible food product having substantially the characteristics of and simulating tomato puree for use in food products as a substitute tomato puree comprising the step of:
    providing a mixture of cooked pureed squash pulp chosen from the group consisting of summer squash and cooked pureed pepper pulp chosen from the group consisting of sweet peppers ripened to a red color; said mixture containing said pureed squash and said pureed pepper pulp in amounts sufficient to produce a product simulating tomato puree.

2. The food product of claim 1 wherein the ratio of squash pulp to pepper pulp is approximately two parts squash pulp to pepper pulp by raw vegetable weight prior to being pureed.

3. The food product of claim 2 wherein the squash pulp is chosen from the group consisting of zucchini or crookneck squash.

4. The food product of claim 3 wherein the pepper pulp is chosen from the group consisting of sweet bell, yolo wonder, California wonder and Italian long sweet peppers.

5. The food product of claim 2 wherein the pepper pulp is chosen from the group consisting of sweet bell, yolo wonder, California wonder and Italian long sweet peppers.

6. The food product of claim 1 wherein the squash pulp is chosen from the group consisting of zucchini or crookneck squash.

7. The food product of claim 6 wherein the pepper pulp is chosen from the group consisting of sweet bell, yolo wonder, California wonder and Italian long sweet peppers.

8. The food product of claim 1 wherein the pepper pulp is chosen from the group consisting of sweet bell, yolo wonder, California wonder and Italian long sweet peppers.

* * * * *